US012759059B2

(12) United States Patent
Johansson et al.

(10) Patent No.: US 12,759,059 B2
(45) Date of Patent: Oct. 13, 2026

(54) METAL CUTTING TURNING TOOL

(71) Applicant: AB SANDVIK COROMANT, Sandviken (SE)

(72) Inventors: Adam Johansson, Sandviken (SE); Ronnie Lof, Sandviken (SE); Krister Wikblad, Sandviken (SE)

(73) Assignee: AB Sandvik Coromant, Sandviken (SE)

( * ) Notice: Subject to any disclaimer, the term of this patent is extended or adjusted under 35 U.S.C. 154(b) by 609 days.

(21) Appl. No.: 18/267,181

(22) PCT Filed: Nov. 3, 2021

(86) PCT No.: PCT/EP2021/080443
§ 371 (c)(1),
(2) Date: Jun. 14, 2023

(87) PCT Pub. No.: WO2022/128235
PCT Pub. Date: Jun. 23, 2022

(65) Prior Publication Data
US 2024/0051036 A1 Feb. 15, 2024

(30) Foreign Application Priority Data
Dec. 15, 2020 (EP) .................................... 20214113

(51) Int. Cl.
*B23B 29/24* (2006.01)

(52) U.S. Cl.
CPC ........ *B23B 29/24* (2013.01); *B23B 2210/022* (2013.01)

(58) Field of Classification Search
CPC .... B23B 5/08; B23B 5/10; B23B 5/12; B23B 5/16; B23B 5/167; B23B 5/40;
(Continued)

(56) References Cited

U.S. PATENT DOCUMENTS 3,455,189 A * 7/1969 Sweet ..................... B23B 29/24 82/158
4,223,576 A * 9/1980 Donnelly ................ B23B 27/04 82/47
(Continued)

FOREIGN PATENT DOCUMENTS

CN 2654257 Y 11/2004
CN 1678419 A 10/2005
(Continued)

OTHER PUBLICATIONS

Zhejun Yuan. "Design Manual for Metal Cutting Tool", Edition 2, Mechanical Industry Press, Jan. 31, 2019, p. 119.

*Primary Examiner* — Nicole N Ramos
(74) *Attorney, Agent, or Firm* — Corinne R. Gorski

(57) ABSTRACT

A turning tool includes a coupling portion extending along a coupling or longitudinal axis, a first cutting element having a first cutting edge, and a second cutting element having a second nose cutting edge separating and connecting a second forward cutting edge and a second rearward cutting edge. The first cutting element includes a first top surface and the second cutting element includes a second top surface. The first and second cutting elements intersect an imaginary circle or cylinder having a center axis perpendicular to the coupling axis. The first cutting element is inclined in relation to the second cutting element by an inclination angle, which is measured around the center axis of the imaginary circle. The second top surface faces in a direction, which is perpendicular to or substantially perpendicular to the coupling axis and perpendicular or substantially perpendicular to the center axis of the imaginary circle or cylinder.

18 Claims, 5 Drawing Sheets

(58) Field of Classification Search
CPC .... B23B 5/46; B23B 1/00; B23B 3/26; B23B 3/265; B23B 3/36; B23B 29/043; B23B 29/04; B23B 2210/02; B23B 2220/12; B23B 2220/00; B23B 2220/44; B23B 2220/445; B23B 2220/40; B23B 2270/54
See application file for complete search history.

(56) References Cited

U.S. PATENT DOCUMENTS

| | | | | | |
|---|---|---|---|---|---|
| 5,375,948 | A | * | 12/1994 | Lindstedt | B23B 27/045 407/116 |
| 5,653,152 | A | * | 8/1997 | Oles | B23B 5/12 408/1 R |
| 7,086,315 | B1 | * | 8/2006 | Beiser | B23B 29/24 82/99.1 |

FOREIGN PATENT DOCUMENTS

| | | | | | |
|---|---|---|---|---|---|
| CN | 2911669 | Y | | 6/2007 | |
| CN | 103203479 | A | * | 7/2013 | B23B 27/1614 |
| CN | 203863031 | U | | 10/2014 | |
| CN | 104858457 | A | * | 8/2015 | B23B 27/00 |
| CN | 207464225 | U | | 6/2018 | |
| DE | 10317344 | A1 | * | 11/2004 | B23P 13/00 |
| EP | 1317981 | A1 | | 6/2003 | |
| EP | 3025812 | A1 | | 6/2016 | |
| EP | 3560638 | A1 | | 10/2019 | |
| JP | S5245893 | U | | 3/1977 | |
| JP | S59201701 | A1 | | 11/1984 | |
| JP | H08243813 | A | | 9/1996 | |
| KR | 20060121472 | A | * | 11/2006 | B23D 13/005 |
| KR | 20180078410 | A | | 7/2018 | |
| KR | 20200029698 | A | | 3/2020 | |
| KR | 20200031891 | A | * | 3/2020 | B23Q 37/00 |
| WO | WO-2004022288 | A2 | * | 3/2004 | B23B 29/242 |

* cited by examiner

Fig. 1
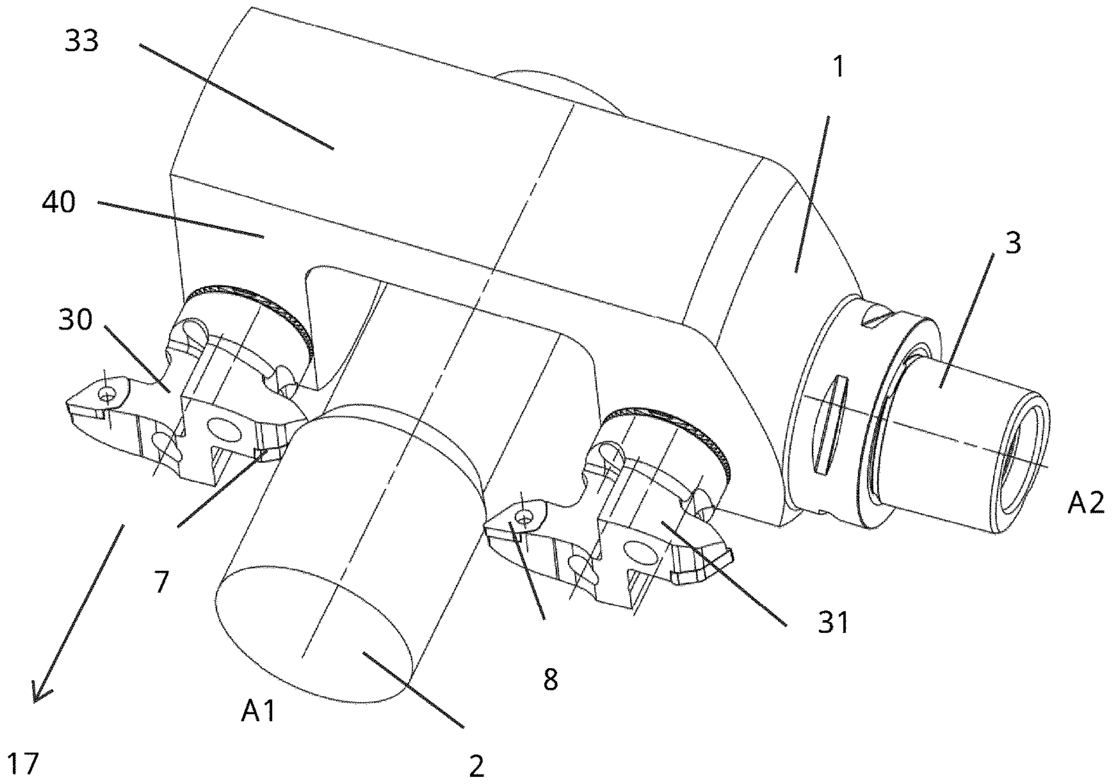
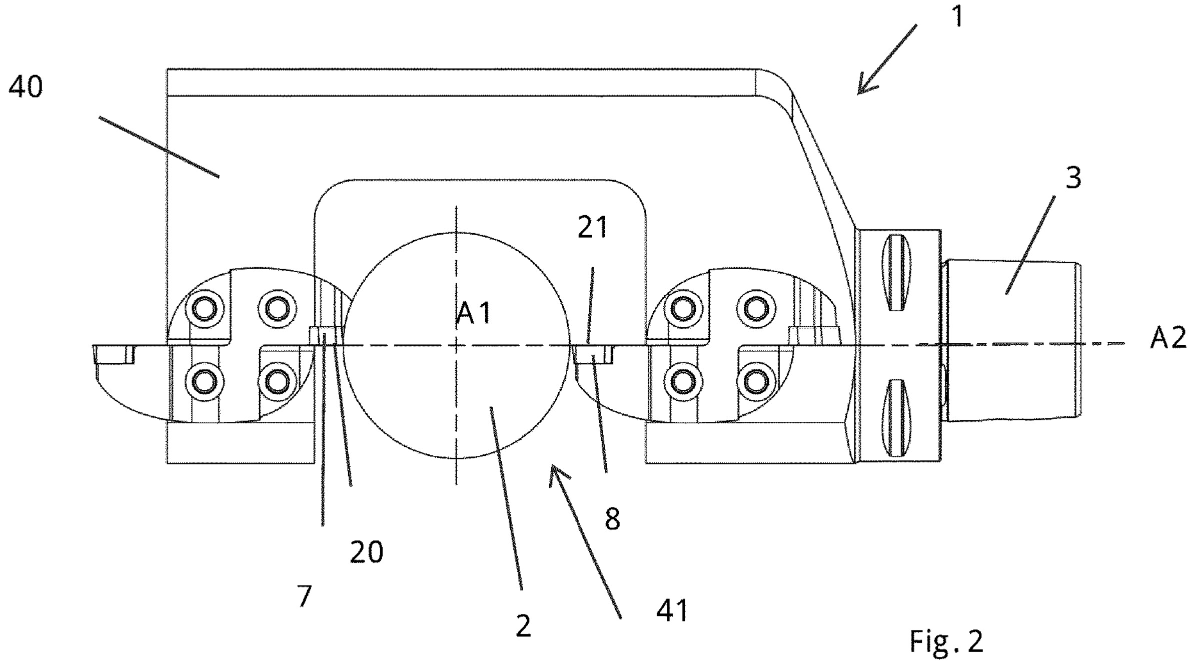
Fig. 2

Fig. 5
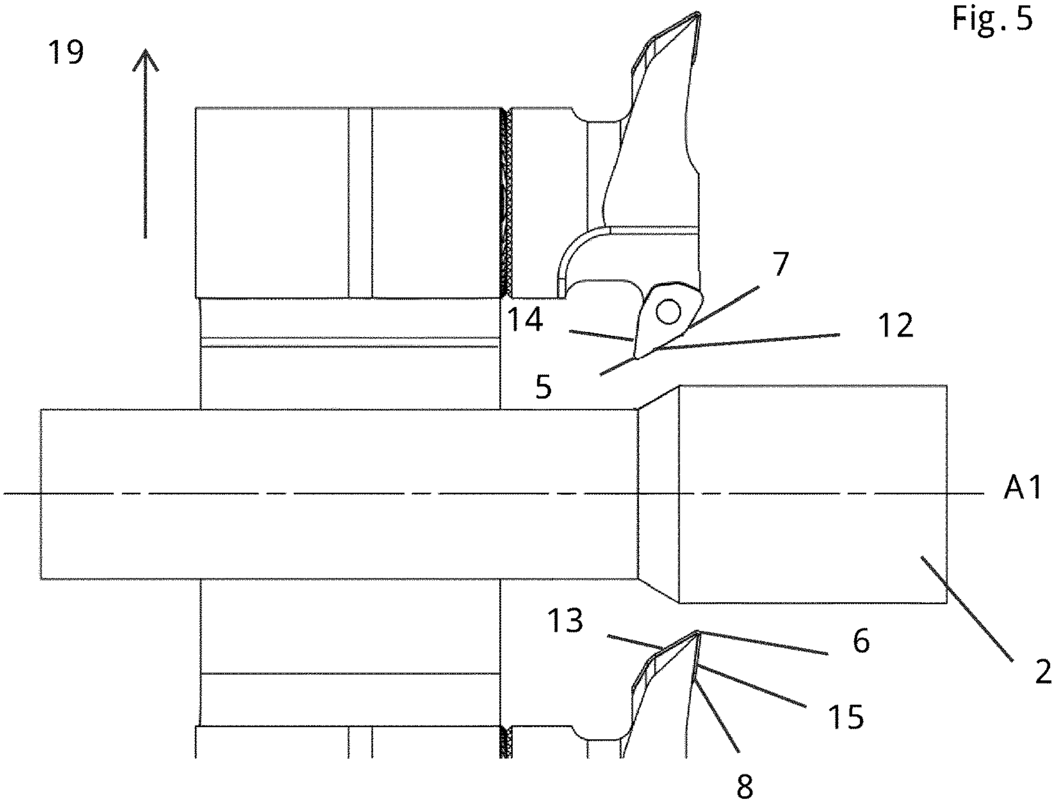
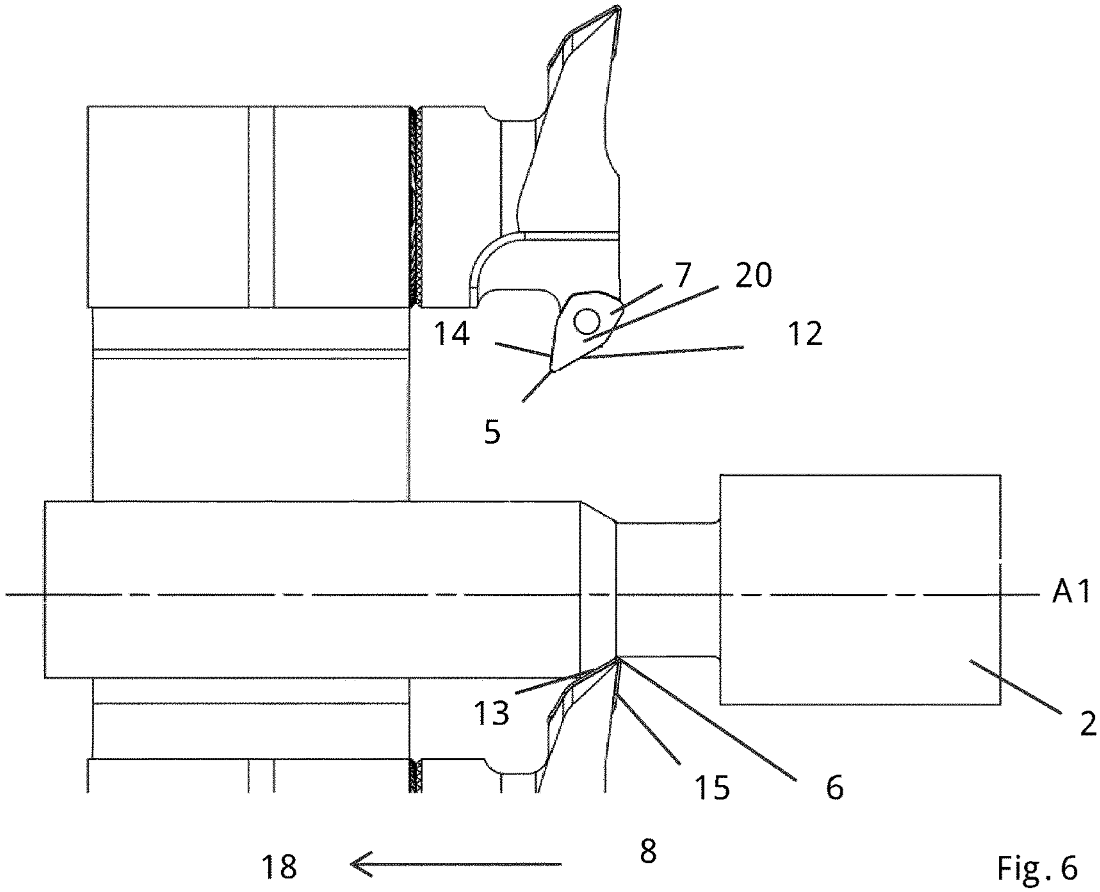
Fig. 6

Fig. 7
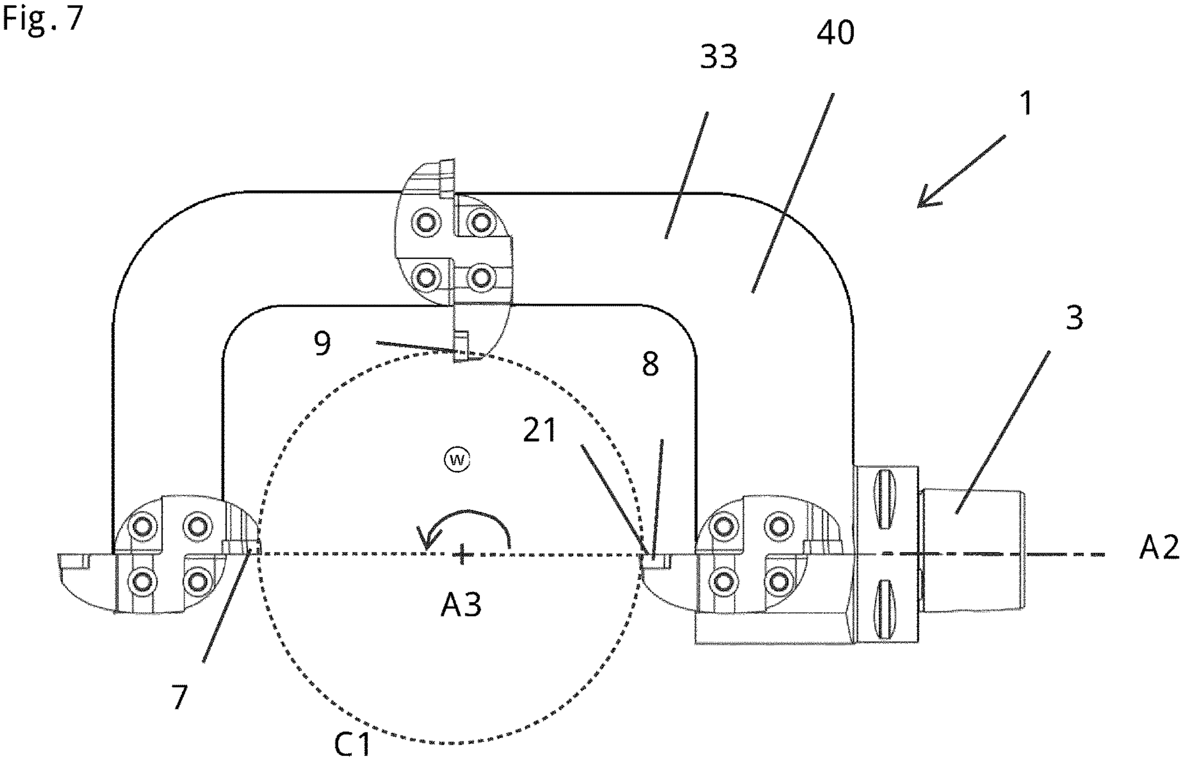
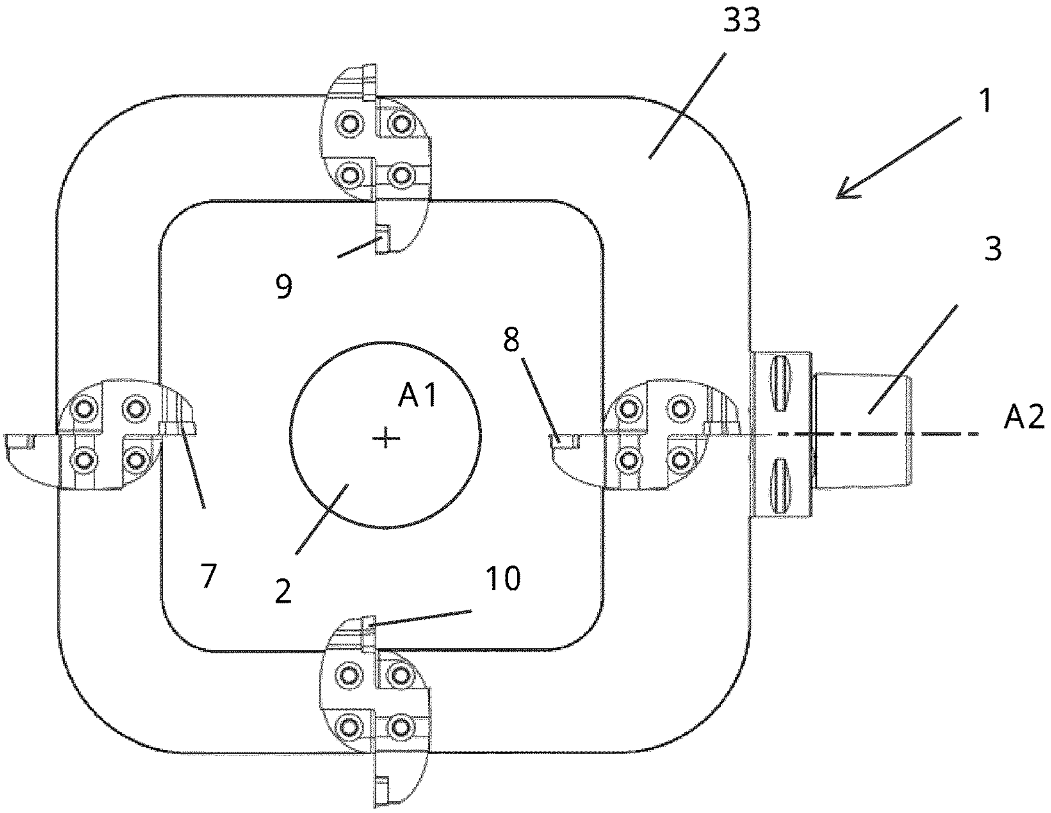
Fig. 8

METAL CUTTING TURNING TOOL

RELATED APPLICATION DATA

This application is a § 371 National Stage Application of PCT International Application No. PCT/EP2021/080443 filed Nov. 3, 2021 with priority to EP 20214113.1 filed Dec. 15, 2020.

TECHNICAL FIELD OF THE INVENTION

The present invention belongs to the technical field of metal cutting. More specifically the present invention belongs to the field of turning.

BACKGROUND OF THE INVENTION AND PRIOR ART

The present invention to a turning tool comprising a coupling portion, wherein the coupling portion extends along a coupling axis, where the coupling axis defines a longitudinal axis of the turning tool, wherein the turning tool comprises a first cutting element and a second cutting element, wherein the first cutting element comprises a first cutting edge, wherein the second cutting element comprises a second nose cutting edge separating and connecting a second forward cutting edge and a second rearward cutting edge, wherein the first cutting element comprises a first top surface, wherein the second cutting element comprises a second top surface.

In a further aspect, the present invention relates to a machining method for a CNC-lathe.

In metal cutting, turning is a common operation. CNC-lathes are commonly used. Normally, a complex shaped is machined from a metal work piece. To achieve the complex shape, it is common to use two or more turning tools, where the turning tools have different geometrical shape or different orientation. For example, one turning tool can be suitable in machining in one direction, and a second turning tool can be suitable to machine in a different direction.

Conventionally, each turning tool is equipped with one turning insert. After turning using one turning insert, normally the first turning tool is indexed to a second turning tool. For example, the CNC-lathe may comprise a turret, and the indexing from one turning tool to a second turning tool is achieved by rotation of the turret by a predetermined angle. Indexing by rotation of a turret takes time, depending e.g. on the CNC-lathe. The time where there is no cutting, such as when changing or indexing from one tool to another can be called down-time.

EP 1 317 981 A1 disclose a tool carrying a plurality of turning inserts, whereby switching between different turning inserts can be achieved quickly, by means of rotation of the turning tool around a coupling axis.

The inventors have found that there is a need for a further improved turning tool.

SUMMARY OF THE INVENTION

It is an object of the invention to provide a turning tool which suitable for machining an object having a complex shape. It is further an object to provide a turning tool which can be used on a wide range of CNC-lathes. A still further object is to provide a turning tool which can be used for a long time of machine. It is a yet further object to provide a turning tool which can help reduce the down-time.

At least one of said objectives is achieved by the initially defined turning tool, where the first and second cutting elements intersect an imaginary circle or cylinder having a center axis thereof perpendicular to the coupling axis, wherein the first cutting element is inclined in relation to the second cutting element by an inclination angle, wherein said inclination angle is measured around the center axis of the imaginary circle, wherein the second top surface is facing in a direction which is perpendicular to or substantially perpendicular to the coupling axis and perpendicular or substantially perpendicular to the center axis of the imaginary circle or cylinder.

By such a turning tool a very quick change or indexing from a first cutting element to a second element can be achieved by a linear motion of the turning tool, such as through a short traverse in the X-axis of the CNC-lathe, where said X-axis can coincide with the coupling axis.

The turning tool is for a CNC-lathe i.e. a computer- or computerized numerical control lathe, i.e. any CNC-machine suitable for turning such as e.g. a turning lathe, a multitask machine, a turn-mill machine, or a sliding head machine. The turning tool is for machining a metal work piece, such as a metal work piece comprises an external surface, which is a radially outer surface, where the radially outer surface is facing away from a rotational axis around which the metal work piece is rotatable. The turning tool is for turning of said radially outer surface, i.e. external turning.

The turning tool comprises a forward end and an opposite rear end in the form of a coupling portion. The coupling portion is removably connectable to the CNC-lathe, more specifically to a machine interface of the CNC-lathe, such as a machine spindle or a tool revolver turret or a tool post.

The coupling portion may have a square or rectangular shape in a cross section. The coupling portion may be conical or substantially conical such as preferably according to ISO standard 26623-1.

The coupling portion extends along a coupling axis or a center axis, which center axis defines a longitudinal axis of the turning tool.

The turning tool comprises a first cutting element and a second cutting element. The first and second cutting elements are spaced apart. The first and second cutting elements are preferably cutting inserts or turning inserts, i.e. replaceable elements made from a wear resistant material, e.g. cemented carbide. Alternatively, the first and second cutting elements can be parts of a single wear resistant element, preferably made from a single piece of cemented carbide. The first cutting element comprises a first top surface. The first top surface comprises a rake face or a rake surface.

The first top surface may in a top-view have a rhomb-shape, a triangular shape, a square shape, a round shape, or a polygon shape. The first top surface and the second top surface may each be flat. Alternatively, one or both of said surfaces may be non-flat or nonplanar. Preferably, said surfaces may comprise one or more chip breaking means, in the form of one or more protrusions and/or depressions.

The direction which the first top surface is facing is a normal to the first top surface, i.e. a direction perpendicular to the first top surface. Said direction is away from the first top surface, and away from the first bottom surface, in case the first cutting element is in the form of a cutting insert or a turning insert, having a first bottom surface.

In case the first top surface is non-flat, for the purpose of determine the direction which the first top surface is facing, such first top surface may be defined as or approximated to a plane parallel to a first mid-plane, where said plane intersects the first cutting edge, or at least a portion of the first cutting edge. Said first mid-plane is a plane mid-way or substantially mid-way between the first top surface and the first bottom surface, in case the first cutting element is in the form of a cutting insert or a turning insert, having a first bottom surface.

Alternatively said first top surface, for the purpose of determine the direction which the first top surface is facing, may be defined as a plane intersecting all nose cutting edges bordering to or adjoining the first top surface.

A corresponding reasoning applies for the second top surface and the second cutting element.

The first cutting element comprises a first cutting edge. The first cutting edge may preferably be in form of a nose cutting edge, i.e. a cutting edge which is convex in a top view. The first cutting edge, or a portion of the first cutting edge, generate the machined surface. The first cutting element may be in the form of a round cutting insert, i.e. an insert which is circular or substantially circular in a top view. The radius of said circle is preferably 5-30 mm. Alternatively, the first cutting edge may be a nose cutting edge which is convex in a top view, preferably in the form of a circular arc, having a radius of curvature of 0.2-1.6 mm, and be arranged between, i.e. connecting, a first forward cutting edge, i.e. a main cutting edge or a principal cutting edge or a leading cutting edge, and a first rearward cutting edge, i.e. an auxiliary cutting edge or a trailing cutting edge.

The second cutting element comprises a second nose cutting edge separating and connecting a second forward cutting edge and a second rearward cutting edge.

The second cutting element comprises a second nose cutting edge separating and connecting a second forward cutting edge and a second rearward cutting edge. The second cutting element comprises a first top surface. The second top surface comprises a rake face or a rake surface. The second forward cutting edge is a leading cutting edge. The second rearward cutting edge is a trailing cutting edge.

The turning tool is suitable for external turning of a cylindrical metal work piece, such as preferably longitudinal turning. The first and second cutting elements can be alternatively used for longitudinal turning of a metal work piece, which rotates in one direction around a rotational axis thereof. Said rotational axis is parallel to the below defined center axis of the imaginary circle or cylinder.

The turning tool is thus suitable for machining a complex shape, where the metal work piece is rotated in one direction only. To change the rotational direction of the metal work piece is time-consuming.

The first and second cutting elements intersect or are arranged along an imaginary circle or cylinder having a center axis thereof which is perpendicular to the coupling axis. Preferably, said cutting elements are arranged along an imaginary circle. By such a turning tool, the turning tool can made relatively slimmer, especially the turning tool can be made narrower, where narrow is defined as the distance along the rotational axis.

Preferably, said center axis intersects or substantially intersects the coupling axis. Substantially intersects means less than 20 mm from the coupling axis. The first cutting element is inclined in relation to the second cutting element by an inclination angle. Preferably, said inclination angle is at least 45°. Even more preferably, said inclination angle is 180°+/−20°, even more preferably 180°+/−10°. If said inclination angle is 180°, the center axis of the imaginary circle or cylinder is between the first cutting edge and the second nose cutting edge.

A distance from the coupling portion to the second cutting element is preferably greater than a distance from the coupling portion to the center axis of the imaginary circle or cylinder.

The turning tool is arranged for turning of a metal work piece rotatable around a rotational axis thereof, where said rotational axis is parallel to said center axis. The second nose cutting edge is the part of the second cutting element which is closest to the center axis. The second nose cutting edge is the part of the second cutting element which is at a greatest distance from the coupling portion. In other words, the second nose cutting edge is the part of the second cutting element which is the most forward or longitudinally most forward part of the second cutting element.

The first cutting edge is the part of the first cutting element which is closest to the center axis.

The first top surface is inclined in relation to the second top surface by an angle which is equal to said inclination angle or within +/−20° of said inclination angle. If the first top surface and the second top surface both extends radially from the center axis of the imaginary circle, said angle is equal to the inclination angle. Alternatively, the first cutting element and/or the second cutting element may be tilted positively or negatively by an angle of up to 10°. In another alternative, the first top surface and/or the second top surface may be arranged to form a positive or negative rake angle.

The first and second top surfaces facing in the same direction along the imaginary circle, in other words the first and second are either both facing a clock-wise direction or a counter clock-wise direction. The top surface of the first cutting element is facing a direction which is different to a direction which the second top surface is facing.

If the first and second top surfaces are not flat, the direction which the top surface is facing can be determined by an imaginary plane which intersects all corners of the respective top surface.

A plane parallel to the first mid-plane and comprising the first top surface intersects a plane parallel to the second mid-plane and comprising the second top surface, where said intersection coincides with or is parallel to the center axis of the imaginary circle or cylinder. If parallel, the distance from said center axis is less than 20 mm, preferably less than 10 mm.

Said first cutting element may be inclined in relation to the second cutting element by 180° or substantially 180°. In such a case, a rake face associated with the first cutting edge and a rake face associate with the second cutting edges are facing in opposite or substantially directions.

The second top surface is facing in a direction which is perpendicular to or substantially perpendicular, i.e. within 15°, to the coupling axis or to an axis parallel to the coupling axis. Formulated differently, a first assumed direction of primary motion in accordance with ISO 3002-1:1982 of the first cutting element is in a direction which is perpendicular to or substantially perpendicular, i.e. within 15°, to the coupling axis or to an axis parallel to the coupling axis.

The second top surface is facing in a direction which is perpendicular or substantially perpendicular, i.e. within 15°, to the center axis of the imaginary circle or cylinder.

A first tool reference plane in accordance with ISO 3002-1:1982 associated with the first cutting element intersects a second tool reference plane in accordance with ISO 3002-1:1982 associated with the second cutting element. The first and second tool reference planes may preferably be in a common plane. In such case, a first assumed direction of primary motion in accordance with ISO 3002-1:1982 of the first cutting element is in a direction which is in the opposite direction to a second assumed direction of primary motion of the second cutting element. The coupling axis preferably extend in said common plane. Alternatively, the coupling axis extend in a plane parallel to said common plane, where the distance between said planes is 20 mm or less. Alternatively, i.e. if said tool reference planes do not extend in a common plane, the first and second tool reference planes may be at an angle relative to each other, wherein said angle is equal to an angle between a first assumed direction of primary motion of the first cutting element and a second assumed direction of primary motion of the second cutting element. Preferably, the first and second tool reference planes intersect along a line, which line is parallel to a rotational axis of a metal work piece to be machined.

No part of the turning tool is between the first cutting edge and the second nose cutting edge. In other words, no part of the turning tool is along a straight line between the first cutting edge and the second nose cutting edge.

The first and second cutting elements are spaced apart longitudinally, where the longitudinal direction is defined by the coupling axis. The first cutting edge and the second nose cutting edge are free ends. In other words, said cutting edges are positioned such that a metal cutting operation can be performed.

According to an embodiment, the first cutting element comprises a first forward cutting edge and a first rearward cutting edge, wherein the first cutting edge is a first nose cutting edge, wherein the first nose cutting edge separates and connects the first forward cutting edge and the first rearward cutting edge.

By such a turning tool, more complex shapes can be machined. For example, a groove may be machined. The first forward cutting edge, which is a principal cutting edge or a main cutting edge, and the first rearward cutting edge, which is an auxiliary cutting edge, are each preferably straight or linear or substantially straight or substantially linear in a top view. The first nose cutting edge is convex in a top view, preferably in the form of a circular arc, preferably having a radius of curvature of 0.2-1.6 mm.

The nose angle of the first cutting element, defined as the angle between the first forward cutting edge and the first rearward cutting edge, is preferably less than or equal to 160°, even more preferably 30°-80°. By such a turning tool, more complex shapes can be machined.

The first forward cutting edge is preferably arranged to form an acute first entering angle, when moving the turning tool in a direction perpendicular to the coupling axis and parallel to a rotational axis of a metal work piece. Preferably said first entering angle is 3-45°, even more preferably 5-30°. By such a turning tool, the wear of the first forward cutting edge can be reduced.

During said moving of the turning tool, the first nose cutting edge and the first forward cutting edge are in cut, i.e. are active.

According to an embodiment, a distance from the coupling axis to the first nose cutting edge is shorter than a distance from the coupling axis to the second nose cutting edge.

Said distances are measured along parallel lines perpendicular to the coupling axis. The difference in distance is preferably 1-30 mm, even more preferably 5-15 mm.

The first cutting element and the second cutting element are thereby arranged such that when moving the turning tool in the first direction, the second nose cutting edge is in the first direction ahead of the first cutting edge.

According to an embodiment, the turning tool comprises a intermediate portion, wherein the intermediate portion comprises a concave portion, wherein the concave portion is curved around the center axis of the imaginary circle or cylinder, wherein the first and second cutting elements are connected to spaced apart portions along the concave portion.

The first and second cutting elements are connected directly or indirectly, e.g. by means of a replaceable cutting tool head, to spaced apart portions along the concave portion. The rotational axis is perpendicular to and intersecting or substantially intersecting, i.e. within 20 mm, the coupling axis. The intermediate portion is between and connecting the coupling portion and the cutting portions. The turning tool comprises a concave portion, or C-shaped portion, or a portion which is curved, or a portion which comprises elements which in total form a concave portion is curved or bent around the center axis of the imaginary circle or cylinder. In other words, the concave portion is spaced apart from the center axis of the imaginary circle or cylinder by a distance. Said distance may be constant or may alternatively vary. In any case said distance is not smaller than the radius of said imaginary circle or cylinder.

According to an embodiment, the concave portion comprises a first side surface, wherein said first side surface is extends in a plane which is perpendicular to or substantially perpendicular to the center axis of the imaginary circle or cylinder, wherein said plane is spaced apart from the coupling axis, wherein the first and second cutting elements are connected to the first side surface, wherein the intermediate portion comprises an opening.

By such a turning tool, the turning tool can made relatively slimmer, especially the turning tool can be made narrower, where narrow is defined as the distance along the rotational axis. By such a turning tool, the turning tool can be brought towards the metal work piece in more ways, such as if the metal work piece is connected to a tailstock at one end.

Relative to said plane, the first and second cutting elements are arranged on one side of said plane, and the coupling axis is arranged on the opposite side of said plane.

The concave portion comprises two side surfaces, a first side surface and an opposite second side surface. The first and second cutting elements are connected to the same side surface.

The first side surface may be planar or substantially planar. Alternatively, the first side surface may have a surface which slightly deviates from a plane.

The first and second cutting elements are connected to protruding elements, which protrude from the first side surface in a direction away from the coupling axis.

The intermediate portion comprises an opening, wherein said opening is radially in relation to the center axis of the imaginary circle or cylinder. In other words, said opening is perpendicular to the center axis of the imaginary circle or cylinder. In other words, the intermediate portion is non-circumferential.

In other words, the first side surface does not completely surround or enclose the center axis. For example, the intermediate portion may be C-shaped in a side view, but not O-shaped.

According to an embodiment, a first nose angle, defined as an angle between the first forward cutting edge and the first rearward cutting edge, is acute.

By such a turning tool, more complex shapes can be machined. By such a turning tool, more feed directions are possible, such as e.g. out-facing. The first nose angle is conventionally measured in a top view. A top view of the first cutting element is when the first rake face is facing the viewer. The first nose angle is preferably 25-80°, even more preferably 30-60°.

According to an embodiment, a second nose angle defined as an angle between the second forward cutting edge and the second rearward cutting edge is acute.

By such a turning tool, more complex shapes can be machined. By such a turning tool, more feed directions are possible, such as e.g. out-facing. The first nose angle is conventionally measured in a top view. A top view of the second cutting element is when the second rake face is facing the viewer. The second nose angle is preferably 25-80°, even more preferably 30-60°.

According to an embodiment, the first cutting element is in the form of a first turning insert, wherein the second cutting element is in the form of a second turning insert, wherein the first turning insert comprises a first top surface and an opposite first bottom surface, wherein the second turning insert comprises a second top surface and an opposite second bottom surface, wherein the first top surface comprises the first rake surface, wherein the second top surface comprises the second rake surface.

By such a turning tool, only the turning inserts must be replaced after use. The top surfaces comprises rake surfaces. The bottom surfaces comprises seating surfaces or contact surfaces.

A first through hole for a first screw intersects the first top and first bottom surfaces.

A second through hole for a second screw intersects the second top and first bottom surfaces.

According to an embodiment, the first cutting element is arranged such that when moving the turning tool in a first direction perpendicular to the coupling axis the first forward cutting edge forms an acute first entering angle, wherein the second cutting element is arranged such that when moving the turning tool in a second direction, opposite to the first direction, the second forward cutting edge forms an acute second entering angle.

By such a turning tool, the wear is reduced. Said first direction is a feed direction and is parallel to a rotational axis of a metal work piece. Said second direction is a feed direction and is parallel to the rotational axis and perpendicular to the coupling axis. The first entering angle is preferably 3-45°. The second forward cutting edge is preferably 3-45°.

According to an embodiment, the first cutting element is arranged such that when moving the turning tool in a first direction, the first rearward cutting edge forms an obtuse first back clearance angle.

By such a turning tool, the first cutting element can be used in more feed directions, e.g. out-facing. By such a turning tool, more complex shapes can be machined. The first back clearance angle is preferably 91-135°, even more preferably 93°-120°. The sum of the entering angle, the nose angle and the back clearance angle equals 180°. This applies to both the first and second cutting elements.

According to an embodiment, the second cutting element is arranged such that when moving the turning tool in a second direction, the second rearward cutting edge forms an obtuse second back clearance angle.

By such a turning tool, the second cutting element can be used in more feed directions, e.g. out-facing. The second back clearance angle is preferably 91°-135°, even more preferably 93°-120°.

According to an embodiment, the first cutting element and the second cutting element are arranged such that the first cutting element and the second cutting element can be used for turning a metal work piece rotatable in one direction around a rotational axis thereof, wherein said rotational axis is arranged perpendicular to and intersecting the coupling axis.

The first cutting element and the second cutting element can be alternatively be used for machining, i.e. turning, without any rotation of the turning tool.

According to an embodiment, the first cutting edge and the second nose cutting edge intersect or substantially intersect a plane comprising the coupling axis.

By such a turning tool, indexing can be made by a linear movement of the turning tool along the coupling axis. Such a turning tool can be used for most CNC-lathes. Substantially intersect means that a distance is less than 2.0 mm from said plane. Preferably the first top surface and the second top surface are in a common plane or are substantially located in a common plane.

According to an embodiment, the turning tool is arranged such that a cylindrical metal work piece can be arranged between the first cutting element and the second cutting element, wherein a longitudinal axis of the metal work piece is between said cutting elements.

Preferably, said longitudinal axis which is a rotational axis of the metal work piece is perpendicular to the coupling axis. The said cylindrical metal work piece preferably has a diameter of 16-500 mm, even more preferably 20-200 mm. The diameter of the metal work piece is smaller than the imaginary circle or cylinder. Said longitudinal axis is parallel to the center axis of the imaginary circle or cylinder.

According to an embodiment, the coupling portion is square or rectangular in a cross section or comprises a tapered or conical or substantially conical portion.

By such a turning tool, mounting is easily achieved in most CNC-lathes. Said cross section is in a plane perpendicular to the coupling axis. The coupling portion preferably comprise a tapered or conical or substantially conical portion and a ring-shaped portion, such as preferably in the form of a polygonal hollow taper interface with a flange contact surface, such in accordance to ISO 26623-1:2014, or a hollow taper with a flange contact surface such as e.g. in accordance to DIN 69893, ISO 12164-1 or ISO 12164-1F.

According to an embodiment, the first and second cutting elements are positioned on the same side relative to a plane, where said plane comprises the coupling axis, and where said plane is parallel to plane which intersects the first top surface at a right angle.

According to an embodiment, a distance from the coupling portion to the first cutting element is greater than a distance from the coupling portion to the second cutting element.

Said distances are longitudinal distances, thus said distances are measured along the coupling axis. The difference between said distances is preferably at least 12 mm, even more preferably at least 25 mm. By such a turning tool, a metal work piece having a diameter of 12 mm can be arranged between said cutting elements, such that a rotational axis thereof is perpendicular to the coupling axis.

According to an embodiment, a turning method for a CNC-lathe comprises the steps of: providing a metal work piece, providing a turning tool as described above, rotating the metal work piece in one direction around a rotational axis thereof; moving the turning tool in a first direction such that the first cutting edge is in cut, moving the turning tool in a direction such that the first cutting edge is moved away from the metal work piece and such that the second nose cutting edge is moved towards the metal work piece, moving the turning tool in a second direction such that the second forward cutting edge is in cut at a second entering angle which is 5-45°, wherein the second direction is in the opposite direction or substantially opposite direction to the first direction.

The turning method is for a CNC-lathe i.e. a computer- or computerized numerical control lathe, i.e. any CNC-machine suitable for turning such as e.g. a turning lathe, a multitask machine, a turn-mill machine, or a sliding head machine. A metal work piece is provided. The metal work piece comprises an external surface, which is a radially outer surface. The radially outer surface is facing away from the rotational axis. The turning method is for turning of the radially outer surface, i.e. external turning. The metal work piece extends between a first end and a second end. The metal work piece is clamped by clamping means. The clamping means holds the metal work piece and are at least partially controlled and driven by a motor or a spindle.

The clamping means may be in the form of a collet chuck, a face driver, a 3-jaw chuck, and may comprise a tail stock. The headstock end of the machine is preferably located at the first end of the metal work piece. A second end of the metal work piece, opposite to the first end of the work piece, may be a free end. Alternatively, the second end is in contact with a tailstock.

Preferably, a distance from the clamping means to the second nose cutting edge is shorter than a distance from the clamping means to the first cutting edge.

The method comprises the step of rotating the metal work piece in one direction around a rotational axis thereof. The one direction may be clock-wise or counter clock-wise.

The rotational axis is parallel to the center axis of the imaginary circle or cylinder.

The method includes the step of moving the turning tool in a first direction, i.e. turning in a first direction. The first direction is a feed direction. The first direction may preferably be parallel to the rotational axis, also known as longitudinal turning. Said step is included in a first pass, which is defined as between going into cut and going out of cut. The first pass is not necessarily a movement of the first cutting element along a straight line. When turning in the first direction, the first cutting edge is in cut. A machined surface is formed by the first cutting edge.

Preferably, the first cutting element comprises a first forward cutting edge and a first rearward cutting edge, wherein the first cutting edge is in the form of first nose cutting edge separating and connecting the first forward cutting edge and the first rearward cutting edge, wherein when turning in the first direction the first forward cutting edge forms an acute first entering angle.

After or during going out of cut, the turning tool is moved such that the first cutting edge is moved away from the metal work piece and such that the second nose cutting edge is moved towards the metal work piece. During at least a portion of said movement, neither the first cutting element nor the second cutting element is in cut, i.e. no metal cutting by the first and second cutting elements during said movement.

Said movement of the turning tool may preferably be a linear movement, i.e. the turning tool is moved linearly. Said movement of the turning tool may preferably be in a direction perpendicular to the rotational axis. Said movement of the turning tool may preferably be in a direction along the coupling axis. Said movement is an indexing movement, i.e. a movement having the purpose to change from arranging the first cutting element in an active position to arranging the second cutting element in an active position.

The method includes the step of moving the turning tool in a second direction, i.e. turning in a second direction. Said second direction is a feed direction. The second direction is in the opposite direction or substantially opposite to the first direction. For example, the first direction and second direction may be parallel to the rotational axis, but in opposite directions. Said step is included in a second pass, which is defined as between going into cut and going out of cut. The second pass is not necessarily a movement of the first cutting element along a straight line. A machined surface is formed by the second nose cutting edge. The second nose cutting edge and the second forward cutting edge is in cut, such that the second forward cutting edge is in cut at a second entering angle which is 5-45°, even more preferably 5-30°.

The second cutting element is inactive when turning in the first direction. The first cutting element is inactive when turning in the second direction.

Preferably, the second direction is in the opposite direction or substantially opposite to the first direction.

Preferably, when turning in the first direction the first forward cutting edge forms an acute first entering angle. Preferably said first entering angle is 3-45°, even more preferably 5-30°. Preferably, the first rearward cutting edge forms an obtuse first back clearance angle. Preferably, said first back clearance angle is 91°-135°, even more preferably 93°-120°.

Preferably, when turning in the second direction the second forward cutting edge is in cut at an acute second entering angle, which second entering angle preferably is 5-45°. Preferably, the second rearward cutting edge forms an obtuse second back clearance angle. Preferably, said second back clearance angle is 91°-135°, even more preferably 93°-120°.

Preferably, said method includes the step of moving the turning tool such that the first cutting edge is moved away from the metal work piece and such that the second nose cutting edge is moved towards the metal work piece is a linear motion.

Said movement is an indexing motion. In other words, the movement is such that the first cutting element is brought to an inactive position and the second cutting element is brought to an active position, i.e. a position where the second element is suitable to cut metal from the metal work piece.

Said linear motion may be by moving the turning tool, e.g. by a linear motion along the coupling axis. Preferably the step of moving the turning tool such that the first cutting edge is moved away from the metal work piece and such that the second nose cutting edge is moved towards the metal work piece is without rotation of the turning tool around the coupling axis. By this, the indexing time can be shorter, compared to a rotational movement.

Preferably, the turning tool does not rotate around the coupling axis during the first pass, the second pass or between the first and second passes. Preferably, the turning tool does not rotate around any other axis, such as any axis parallel to the coupling axis, during or between the first and second passes.

Preferably, said method includes the step of during the second pass turning, i.e. machining, at least a portion of a surface machined during the first pass.

Preferably, the first and second nose cutting edges are spaced apart along the rotational axis by a constant distance, when turning in the first direction and when turning in the second direction. Preferably, said method includes the step of setting the coupling axis perpendicular to the rotational axis.

Preferably, said method includes the step of setting the second nose cutting edge ahead of the first cutting edge during the first pass, i.e. when moving the turning tool in the first direction. Preferably, said method includes the step of setting the first cutting edge ahead of the second nose cutting edge during the second pass, i.e. when moving the turning tool in the second direction. Ahead is to be understood as ahead in the feed direction, along the rotational axis.

Preferably, the second pass is in a direction away from a corner. A corner, or a shoulder, is defined as the intersection between a first surface concentric with the rotational axis, and a second surface perpendicular to the rotational axis. The first surface may be an external surface or an internal surface, i.e. a surface inside a bore. Preferably, the first surface is an external surface, i.e. a radially external surface.

Preferably, the first pass is in a direction towards a corner. This means that the first pass is in a direction towards a corner or a would be corner, preferably a corner which is finished after the second pass. The first pass thus comprises a roughing of a corner, i.e. removing some but not all material for a desired or predefined shape. A corner, or a shoulder, is defined as the intersection between a first surface concentric with the rotational axis, and a second surface perpendicular to the rotational axis. The first surface may be an external surface or an internal surface, i.e. a surface inside a bore. Preferably, the first surface is an external surface, i.e. a radially external surface.

According to an aspect of the invention, there is provided a computer program having instructions which when executed by a CNC-lathe causes the CNC-lathe to perform the steps according to any of the preceding methods.

Said computer program, or computer program product, may be included in a CAM-software product, i.e. a software for computer-aided manufacturing. Said computer program may be in the form a computer readable medium such as a USB-stick, a CD-ROM or a data stream.

DESCRIPTION OF THE DRAWINGS

The present invention will now be explained in more detail by a description of embodiments of the invention and by reference to the accompanying drawings.

FIG. 1 is a perspective view of a turning tool according to a first embodiment and a metal work piece.

FIG. 2 is a side view of the turning tool and metal work piece in FIG. 1.

FIG. 5 is a yet a bottom view of a part of the turning tool and metal work piece in FIG. 1.

FIG. 6 is a yet a bottom view of a part of the turning tool and metal work piece in FIG. 1.

FIG. 7 is a side view of a turning tool according to a second embodiment.

FIG. 8 is a side view of a turning tool according to a third embodiment and a metal work piece.

Figure 3:
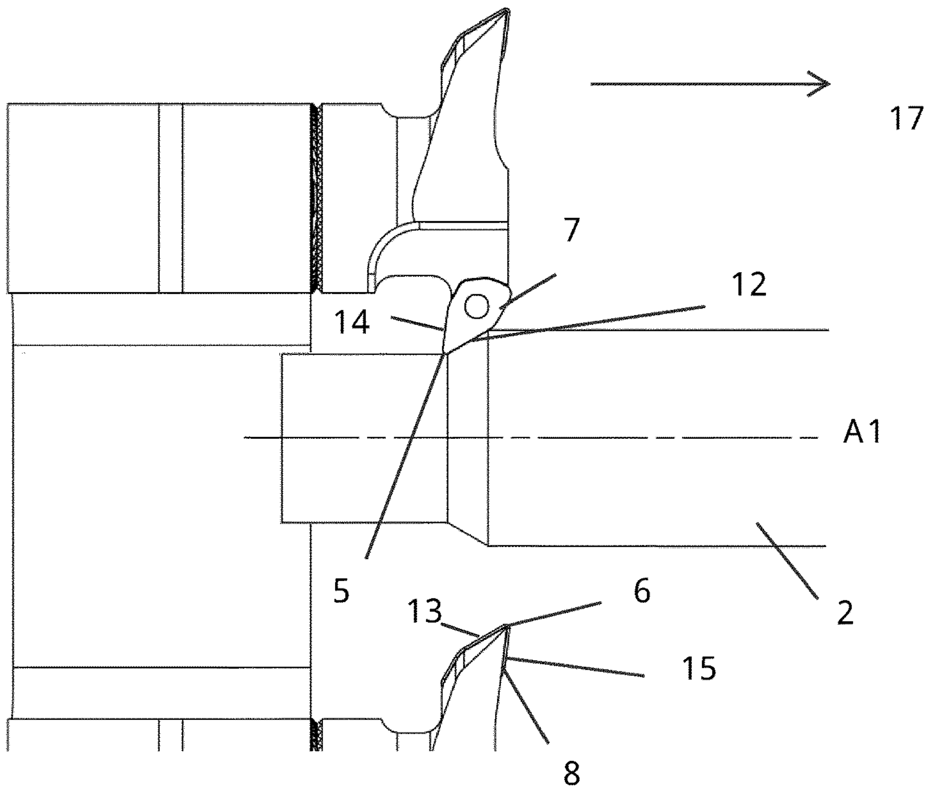
FIG. 3 is a schematic bottom view of a part of the turning tool and metal work piece in FIG. 1.

All turning tools in the figures are drawn to scale.

DETAILED DESCRIPTION OF EMBODIMENTS OF THE INVENTION

Reference is made to FIGS. 1-6 which show a turning tool 1 according to a first embodiment suitable for carrying out the above defined method. A metal work piece 2 is connected to a spindle (not shown) of a CNC-lathe (not shown) by clamping means (not shown). The turning tool 1 comprises a coupling portion 3 extending along a coupling axis A2. The coupling axis A2 defines a longitudinal axis of the turning tool 1. The forward direction is away from the coupling portion 3, i.e. the forward direction is substantially towards the left-hand side in FIG. 1. The rotational axis A1 of the metal work piece 2 is arranged perpendicular to and intersecting the coupling axis A2. The turning tool 1 comprises a first cutting element 7 in the form of a first turning insert 7 and a second cutting element 8 in the form of a second turning insert 8.

As seen in FIGS. 3-6, the first cutting element 7 comprises a first cutting edge 5 in the form of a first nose cutting edge 5, which separates and connects a first forward cutting edge 12 and the first rearward cutting edge 14. The second turning insert 8 comprises a second nose cutting edge 6 separating and connecting a second forward cutting edge 13 and a second rearward cutting edge 15.

Figure 4:
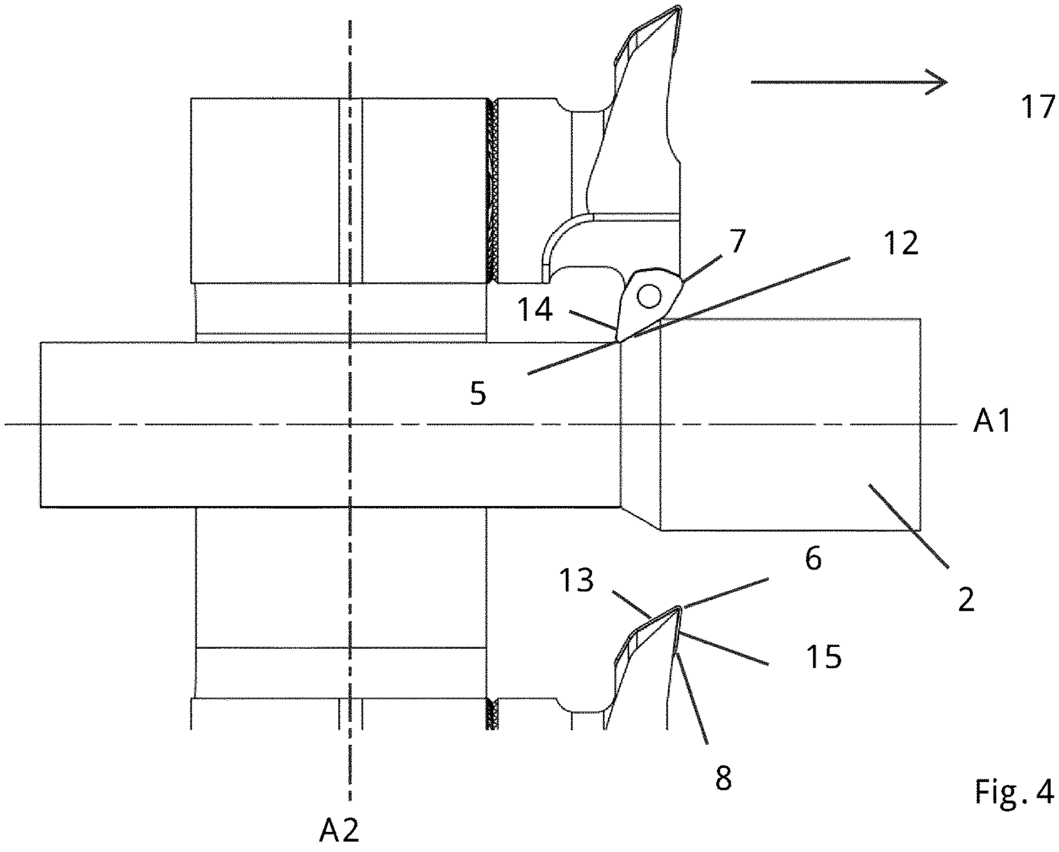
FIG. 4 is a further bottom view of a part of the turning tool and metal work piece in FIG. 1.

As seen in FIG. 2, the first turning insert 7 comprises a first top surface 20 and the second turning insert 8 comprises a second top surface 21. In FIG. 2, the metal work piece 2 rotates clock-wise around a rotational axis A1 thereof. The first cutting edge and the second nose cutting edge intersect or substantially intersect a plane comprising the coupling axis A2 and the rotational axis A1. In FIG. 2, the first turning insert 7 is in cut and the second turning insert 8 is only a very small distance from the metal work piece 2. Preferably, the distance between the metal work piece 2 and the inactive second turning insert 8 is greater, such as shown in FIGS. 3 and 4. FIG. 2 shows that a distance from the coupling portion (3) to the first cutting element (7) is greater than a distance from the coupling portion (3) to the second cutting element (8).

In FIGS. 1 and 2, the turning tool 1 comprises an intermediate portion 33 in the form of a concave portion 33 or curved portion, connecting the first and second turning inserts 7, 8. The intermediate portion 33 comprises an opening 41. The opening 41 or void or cavity makes room for a metal work piece to be machined. The concave portion 33 is curved around an axis perpendicular to the coupling axis A2, where said axis intersect said opening 41 or void or cavity. As can be seen in e.g. FIG. 2, the opening 41 opens radially in relation to the rotational axis A1. The turning tool 1 can be brought in the position as shown in FIG. 2 from above in FIG. 2, at least if the metal work piece 2 diameter is less than the distance between the first and second turning inserts 7, 8. This is an advantage especially if the metal work piece 1 is long or is clamped at both ends.

The intermediate portion 33 comprises a first side surface 40 and an opposite second side surface. Due to the opening 41, the first side surface 40 does not completely surround or enclose the rotational axis A1. The first side surface 40 is extends in a plane which is perpendicular to the rotational axis A1. Said plane 40 is spaced apart from the coupling axis A2.

Protruding from the first side surface 40 are protruding portions 30, 31 in the form of replaceable cutting heads 30, 31, which are connected to the first side surface by clamping means. Each cutting head 30, 31 comprises at least one insert seat. The first and second turning inserts 7, 8 are connected to the first side surface 40 by means of a respective cutting heads 30, 31.

In FIG. 2, the rotational axis A1 is perpendicular to and intersecting the coupling axis A2. As seen in FIG. 2, the rotational axis A2 of the metal work piece 2 is between the first and second turning insert 7, 8. The coupling portion 3 comprises a tapered portion. The coupling portion 3 is quick-change coupling which in the industry is known as Coromant Capto®. In an alternative embodiment (not shown), the coupling portion 3 is square shaped in a cross section, and the coupling axis A2 is parallel to the coupling axis A2 in FIG. 2 and 5-20 mm below the coupling axis A2 in FIG. 2.

When the first turning insert 7 is seen in a top view, as in e.g. FIG. 3, a first nose angle defined as an angle between the first forward cutting edge 12 and the first rearward cutting edge 14 is acute.

When the second turning insert is seen in a top view, or in a bottom view as in e.g. FIG. 3, a second nose angle defined as an angle between the second forward cutting edge 13 and the second rearward cutting edge 15 is acute.

As seen in e.g. FIG. 1, a first through hole for a first screw (not shown) intersects the first top and first bottom surfaces, and a second through hole for a second screw (not shown) intersects the second top and first bottom surfaces.

FIGS. 3 and 4 show a first machining step where the turning tool 1 is moved in a first direction 17, perpendicular to the coupling axis A2. The first forward cutting edge 12 forms an acute first entering angle. The first rearward cutting edge 14 forms an obtuse first back clearance angle. The first turning insert 7 is in cut. The second turning insert 8 is spaced apart from the metal work piece 2. The second nose cutting edge 6 is in the first direction 17 ahead of the first nose cutting edge 5.

After the step shown in FIGS. 3 and 4, the first turning insert 7 goes out of cut, and the turning tool 1 is moved in a direction 19 such that the first cutting edge 5 is moved away from the metal work piece 2 and such that the second nose cutting edge 6 is moved towards the metal work piece 2, as shown in FIG. 5. The first turning insert 7 is moved radially away from the rotational axis A1 of the metal work piece 2.

After the step shown in FIG. 5 follows the step shown in FIG. 6. FIG. 6 shows moving the turning tool 1 in a second direction 18, where the second direction 18 is in the opposite direction to the first direction 17 shown in FIGS. 4 and 5. The second turning insert 8 is in cut. The first turning insert 7 is inactive. In other words, the first turning insert is spaced apart from the metal work piece 2. The second forward cutting edge 13 forms an acute second entering angle. The second rearward cutting edge 15 forms an obtuse second back clearance angle.

The metal work piece 2 rotates in the same direction around the rotational axis thereof A1 in FIGS. 3, 4 and 6.

In FIGS. 4-6, the first and second turning inserts 7, 8 work in the XZ-plane of the CNC-lathe (not shown). Thanks to utilizing small entering angles the insert wear is reduced, but thanks to another insert it is still possible to machine a corner with the other insert. The very quick change of insert as seen in FIG. 5 is due to a short traverse in the X-axis of the CNC-lathe.

FIG. 7 shows a turning tool 1 according to a second embodiment. The only substantial difference between the turning tool 1 according to the first and second embodiments is that the turning tool 1 according to the second embodiment comprises a third turning insert 9. While indexing from the first turning insert 7 to the second turning insert 8 or vice versa is through a movement of the turning tool 1 along the coupling axis A2, indexing to the third turning insert 9 is through a movement of the turning tool in a direction perpendicular to the coupling axis A2, more specifically downwards in FIG. 2. As seen in FIG. 7, the first and second turning inserts 7, 8 as well as the third turning insert 9 intersect an imaginary circle or cylinder C1 having a center axis A3 thereof perpendicular to the coupling axis A2. The first turning insert 7 is inclined in relation to the second turning insert 8 by an inclination angle ω. The inclination angle ω is measured around the center axis A3 of the imaginary circle C1. The second top surface 21 is facing in a direction which is perpendicular to the coupling axis A2 and perpendicular or substantially perpendicular to the center axis A3 of the imaginary circle or cylinder C1.

FIG. 8 shows a turning tool 1 according to a third embodiment and a metal work piece 2. The only substantial difference between the turning tool 1 according to the second and third embodiments is that the turning tool 1 according to the third embodiment comprises a fourth turning insert 10 and that the intermediate portion 33 completely surrounds rotational axis A1. In other words, the intermediate portion does not comprise a radial opening.

The metal work piece can have a different shapes compared to what has been described above. The metal work piece may be in the form of a bar, a hollow bar or any other shape which has a rotational symmetry or substantially has a rotationally symmetry around a rotational axis thereof. The shape which can be machined can be of different configurations than what have been described above. For example, the shape can have not only one, but two side walls, i.e. surfaces which is in a plane perpendicular to the rotational axis. In other words, the turning tool can be used to machine an external groove.

Figure 9:
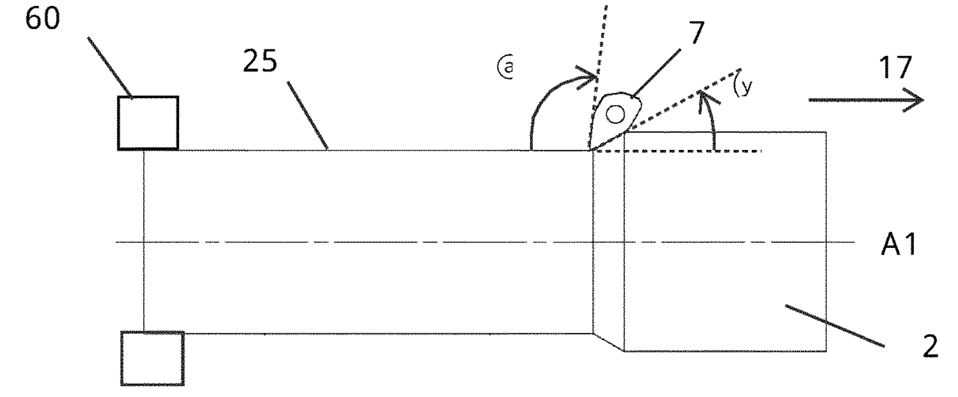
FIG. 9 is a schematic figure of moving a turning tool in a first direction.

FIG. 9 is a schematic figure of moving a turning tool in a first direction 17 where the first cutting element 7 is in cut. The first direction 17 is a feed direction. The first forward cutting edge forms a first entering angle α which is 5-45°, and the first rearward cutting edge forms an obtuse back clearance angle γ of at least 91°. The second cutting element 8 is spaced apart from the metal work piece 2. A machined surface 25 is formed by the first cutting element 7. More specifically, the surface 25 is formed by the first nose cutting edge 5.

Figure 10:
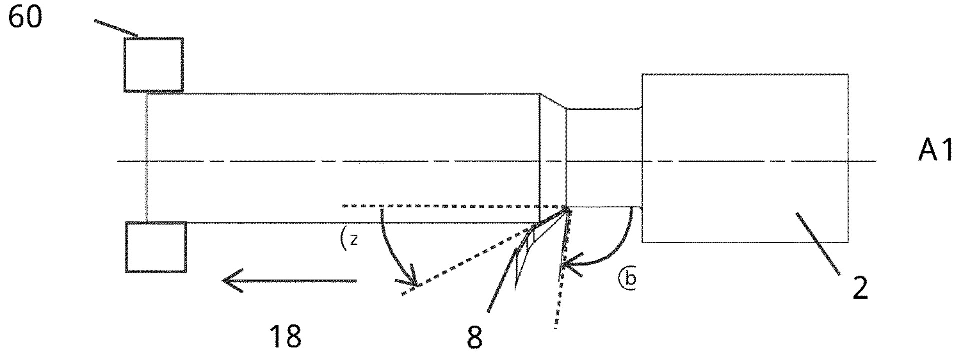
FIG. 10 is a schematic figure of moving a turning tool in a second direction.

FIG. 10 is a schematic figure of moving a turning tool in a second direction 18 where the second cutting element 8 is in cut. The second forward cutting edge is in cut at a second entering angle β which is 5-45°, and the second rearward cutting edge forms an obtuse back clearance angle δ. The second bottom surface is facing the viewer.

FIG. 9 show a first machining step, which can be followed by a step showed in FIG. 10. In FIG. 10, the second cutting element 8 is on the opposite side of the rotational axis A1 as the first cutting element 7 in FIG. 9, and the first top surface is facing the opposite direction as the second top surface.

The metal work piece 2 in FIGS. 9 and 10 is clamped by clamping means 60 at one end. Said clamping means 60 are connected to and driven by a rotating or rotatable spindle (not shown), which are part of a CNC-lathe (not shown). Said clamping means may be in the form of e.g. a collet chuck, a 3-jaw chuck or a face driver. A distance from the clamping means 60 to the second nose cutting edge 6 is shorter than a distance from the clamping means 60 to the first cutting edge 5, where said distances are measured along lines parallel to the rotational axis A1. In FIGS. 9 and 10, the first direction 17 is away from the clamping means 60, and the second direction 18 is towards the clamping means. Alternatively (not shown), the first direction 17 is towards the clamping means 60, and the second direction 18 is away from the clamping means. The first and second directions 17, 18 are thus in opposite directions along the rotational axis A1. Opposite directions can thus be understood as towards or away from the clamping means or towards or away from one longitudinal end of the metal work piece. The first and second directions are thus not necessarily linear and parallel to the rotational axis.

The steps shown in FIGS. 9 and 10 can be performed using the turning tool according to the first, second or third embodiment.

Figure 11:
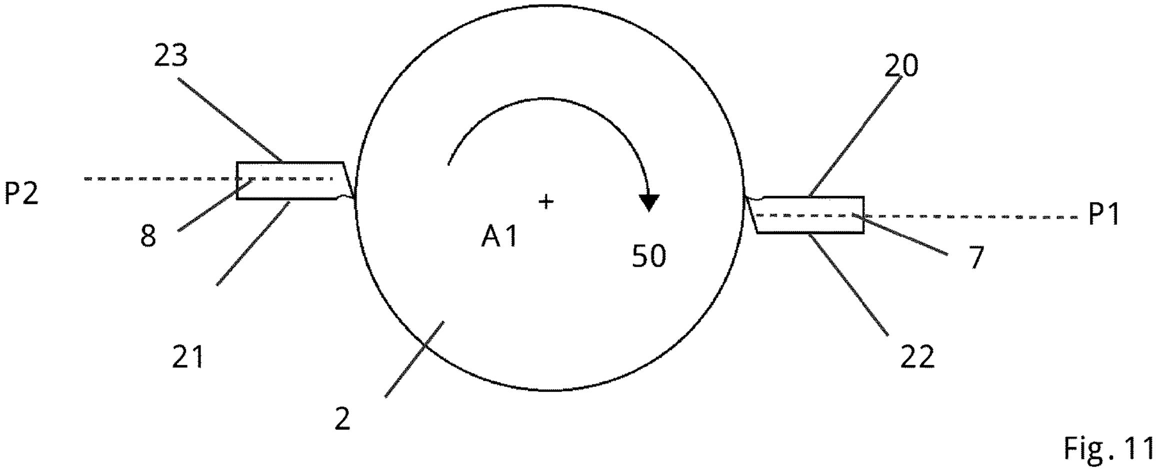
FIG. 11 is a schematic figure showing a first cutting element, a second cutting element and a rotating metal work piece in a cross section.

FIG. 11 is a schematic figure showing a first cutting element 7 in the form of a first turning insert 7, a second cutting element 8 in the form of a second turning insert 8 and a rotating metal work piece in a cross section. The first and second turning inserts 7, 8 are arranged according to the first, second or third turning tool embodiments. The first turning insert 7 comprises a first top surface 20 and a first bottom surface 22, both are horizontal or substantially horizontal. The second cutting insert 8 comprises second top surface 21 and a second bottom surface 23, both are horizontal or substantially horizontal. A first mid plane P1 is mid-way or substantially mid-way between the first top surface 20 and the first bottom surface 22. The first mid-plane P1 is parallel to or substantially parallel to the first bottom surface 22. The second mid plane P2 is arranged in a corresponding manner. The first and second mid planes P1, P2 are arranged in parallel planes. The metal work piece 2 rotates in one direction 50 around a rotational axis A1 thereof. The first and second turning inserts 7, 8 are located on opposite sides of the rotational axis A1. The first top surface 20 is facing upwards in the figure, and the second top surface 21 is facing downwards in the figure. When the first turning insert 7 is in cut, the second turning insert 8 is spaced apart from the metal work piece 2. In e.g. FIG. 11, a distance from the coupling axis A2 to the first nose cutting edge 5 is shorter than a distance from the coupling axis A2 to the second nose cutting edge 6.

FIG. 10, as well as FIG. 6 and FIG. 15, shows how the second direction 18 is in a direction away from a corner of the metal work piece 2. In other words, the second direction 18 is in a direction away from a surface which is in a plane perpendicular to the rotational axis A1. Said corner, or a shoulder, is the intersection between a surface concentric with the rotational axis, and a second surface perpendicular to the rotational axis. Said corner is a 90° corner. Said corner is preferably completely formed by the second cutting element, where the turning tool is moved towards the rotational axis A1, immediately prior to moving the turning tool in the second direction 18.

The first and second turning inserts 7, 8 described in the embodiments above are preferably made from a wear resistant material, preferably cemented carbide. The first and second top surfaces 20, 21 preferably comprises chip forming means or chip breaking means (not shown). Preferably, a distance from at least a portion of said chip forming means or chip breaking means to the mid-plane of the respective turning insert is greater than a distance from the cutting edge bordering to the top surface to said mid-plane. In other words, the top surfaces 20, 21 of the first and second turning inserts comprises at least one protrusion, which in a side view is higher than or above the cutting edge. In such a way, the turning inserts are more suitable for turning.

The first and second turning inserts 7, 8 described in the embodiments above are preferably designed such that the first forward cutting edge 12 is sloping downwards, i.e. towards the first bottom surface 22, at increasing distance from the first nose cutting edge 5. The second forward cutting edge 13 is preferably arranged in a corresponding manner. In such a way, the chip control is further improved.

The forward and rearward cutting edges are forward and rearward in the respective feed directions, not necessarily forward or rearward in relation to forward or rearward directions of the turning tool itself.

The invention claimed is:

1. A turning tool comprising:

a coupling portion, wherein the coupling portion extends along a coupling axis, and wherein the coupling axis defines a longitudinal axis of the turning tool; and a first cutting element and a second cutting element, wherein the first cutting element includes a first cutting edge, and wherein the second cutting element includes a second nose cutting edge separating and connecting a second forward cutting edge and a second rearward cutting edge, wherein the first cutting element includes a first top surface, and wherein the second cutting element includes a second top surface, wherein the first and second cutting elements intersect an imaginary circle or cylinder having a center axis perpendicular to the coupling axis, wherein the first cutting element is inclined in relation to the second cutting element by an inclination angle, wherein said inclination angle is measured around the center axis of the imaginary circle, wherein the second top surface is facing in a direction which is perpendicular to or substantially perpendicular to the coupling axis and perpendicular or substantially perpendicular to the center axis of the imaginary circle or cylinder, and wherein the first cutting element is arranged such that when moving the turning tool in a first direction perpendicular to the coupling axis the first forward cutting edge forms an acute first entering angle, and wherein the second cutting element is arranged such that when moving the turning tool in a second direction, opposite to the first direction, the second forward cutting edge forms an acute second entering angle.

2. The turning tool according to claim 1, wherein the first cutting element includes a first forward cutting edge and a first rearward cutting edge, wherein the first cutting edge is a first nose cutting edge, and wherein the first nose cutting edge separates and connects the first forward cutting edge and the first rearward cutting edge.

3. The turning tool according to claim 2, wherein a distance from the coupling axis to the first nose cutting edge is shorter than a distance from the coupling axis to the second nose cutting edge.

4. The turning tool according to claim 1, further comprising an intermediate portion, wherein the intermediate portion includes a concave portion, wherein the concave portion is curved around the center axis of the imaginary circle or cylinder, and wherein the first and second cutting elements are connected to spaced apart portions along the concave portion.

5. The turning tool according to claim 4, wherein the concave portion includes a first side surface, wherein said first side surface extends in a plane which is perpendicular to or substantially perpendicular to the center axis of the imaginary circle or cylinder, wherein said plane is spaced apart from the coupling axis, wherein the first and second cutting elements are connected to the first side surface, and wherein the intermediate portion includes an opening.

6. The turning tool according to claim 1, wherein a first nose angle, defined as an angle between the first forward cutting edge and the first rearward cutting edge, is acute.

7. The turning tool according to claim 1, wherein a second nose angle, defined as an angle between the second forward cutting edge and the second rearward cutting edge is acute.

8. The turning tool according to claim 1, wherein the first cutting element is in the form of a first turning insert, wherein the second cutting element is in the form of a second turning insert, wherein the first turning insert includes a first top surface and an opposite first bottom surface, wherein the second turning insert includes a second top surface and an opposite second bottom surface, wherein the first top surface includes a first rake surface, and wherein the second top surface includes a second rake surface.

9. The turning tool according to claim 1, wherein the first cutting element is arranged such that when moving the turning tool in a first direction, the first rearward cutting edge forms an obtuse first back clearance angle.

10. The turning tool according to claim 9, wherein the second cutting element is arranged such that when moving the turning tool in a second direction, the second rearward cutting edge forms an obtuse second back clearance angle.

11. The turning tool according to claim 1, wherein the first cutting element and the second cutting element are arranged such that the first cutting element and the second cutting element are arranged for turning a metal work piece rotatable in one direction around a rotational axis, wherein said rotational axis is arranged perpendicular to and intersecting the coupling axis.

12. The turning tool according to claim 1, wherein the first cutting edge and the second nose cutting edge intersect or substantially intersect a plane having the coupling axis.

13. The turning tool according to claim 1, wherein the turning tool is arranged such that a cylindrical metal work piece is arranged between the first cutting element and the second cutting element, wherein a longitudinal axis of the metal work piece is between said cutting elements.

14. The turning tool according to claim 1, wherein the coupling portion is square or rectangular in a cross section, or has a tapered or conical or substantially conical portion.

15. The turning tool according to claim 1, wherein the first and second cutting elements are positioned on the same side relative to a plane, where said plane includes the coupling axis, and where said plane is parallel to plane which intersects the first top surface at a right angle.

16. The turning tool according to claim 1, wherein a distance from the coupling portion to the first cutting element is greater than a distance from the coupling portion to the second cutting element.

17. A turning method for a CNC-lathe, comprising the steps of:

providing a metal work piece;

providing a turning tool according to claim 1;

rotating the metal work piece in one direction around a rotational axis;

moving the turning tool in a first direction such that the first cutting edge is in cut;

moving the turning tool in a direction such that the first cutting edge is moved away from the metal work piece and such that the second nose cutting edge is moved towards the metal work piece; and moving the turning tool in a second direction such that the second forward cutting edge is in cut at a second entering angle, which is 5-45°, wherein the second direction is in the opposite direction or substantially opposite direction to the first direction.

18. A computer program having instructions, which when executed by a CNC-lathe, causes the CNC-lathe to perform the steps according to claim 17.

* * * * *